(12) United States Patent
Dionisi et al.

(10) Patent No.: US 11,812,754 B2
(45) Date of Patent: Nov. 14, 2023

(54) DIETARY FIBRE COMPOSITION

(71) Applicant: SOCIETE DES PRODUITS NESTLE S.A., Vevey (CH)

(72) Inventors: Fabiola Dionisi, Epalinges (CH); Isabel Fernandez Farres, Lausanne (CH); Lennart Fries, Belmont-sur-Lausanne (CH); Sanyasi Gaddipati, Singen (DE); Zeynel Deniz Gunes, Lausanne (CH); Christian Kjolby, Bretigny-sur-Morrens (CH); Christoph Thomas Reh, Epalinges (CH); Laurent Sagalowicz, Blonay (CH)

(73) Assignee: Societe des Produits Nestle S.A., Vevey (CH)

( * ) Notice: Subject to any disclaimer, the term of this patent is extended or adjusted under 35 U.S.C. 154(b) by 708 days.

(21) Appl. No.: 16/637,343

(22) PCT Filed: Aug. 10, 2018

(86) PCT No.: PCT/EP2018/071725
§ 371 (c)(1),
(2) Date: Feb. 7, 2020

(87) PCT Pub. No.: WO2019/030370
PCT Pub. Date: Feb. 14, 2019

(65) Prior Publication Data
US 2021/0368810 A1 Dec. 2, 2021

(30) Foreign Application Priority Data
Aug. 10, 2017 (EP) .................................... 17185798

(51) Int. Cl.
*A21D 13/068* (2017.01)
*A23L 33/21* (2016.01)
(Continued)

(52) U.S. Cl.
CPC ............. *A21D 13/068* (2013.01); *A21D 2/36* (2013.01); *A21D 13/16* (2017.01); *A23D 7/015* (2013.01); *A23L 33/21* (2016.08)

(58) Field of Classification Search
None
See application file for complete search history.

(56) References Cited

U.S. PATENT DOCUMENTS 5,080,915 A * 1/1992 Zock ...................... A21D 13/16
426/94
2011/0311599 A1 * 12/2011 Boursier ................... A23J 3/26
507/104

FOREIGN PATENT DOCUMENTS

CA 2197040 * 8/1997 ............. A21D 13/08
EP 0251375 1/1988
(Continued)

OTHER PUBLICATIONS

AACC Report, "The Definition of Dietary Fiber". Mar. 2001, vol. 46, No. 3, pp. 112-126. (Year: 2001).*
(Continued)

*Primary Examiner* — Jenna A Watts
(74) *Attorney, Agent, or Firm* — K&L Gates LLP

(57) ABSTRACT

The present invention relates to a composition comprising a dispersion of dietary fibre particles in fat. In particular, a composition wherein the dietary fibre particles comprise water. Further aspects of the invention include the use of the composition to reduce saturated fatty acid content, a process for preparing the composition and a food product.

9 Claims, 15 Drawing Sheets

(51) Int. Cl.
*A21D 13/16* (2017.01)
*A21D 2/36* (2006.01)
*A23D 7/015* (2006.01)

(56) References Cited

FOREIGN PATENT DOCUMENTS

| WO | 2013045523 | 4/2013 |
| WO | 2016102315 | 6/2016 |
| WO | 2017067901 | 4/2017 |

OTHER PUBLICATIONS

Sadaf et al. "Peanut butter incorporation as substitute for shortening in biscuits: Composition and acceptability studies" International Food Research Journal, 2013, vol. 20, No. 5, pp. 3243-3247.
Inglett et al. "A soluble fibre gel produced from rice bran and barley flour as a fat replacer in Asian foods" International Journal of Food Science and Technology, 2004, vol. 39, pp. 1-10.
Pszczola, Donald E. "Future Strategies for Fat Replacement" Food Technology, Jun. 1, 2006, pp. 61-84, XP055260546.

\* cited by examiner

DIETARY FIBRE COMPOSITION

CROSS REFERENCE TO RELATED APPLICATIONS

The present application is a National Stage of International Application No. PCT/EP2018/071725, filed on Aug. 10, 2018, which claims priority to European Patent Application No. 17185798.0, filed on Aug. 10, 2017, the entire contents of which are being incorporated herein by reference.

FIELD OF THE INVENTION

The present invention relates to a composition comprising a dispersion of dietary fibre particles in fat. In particular, a composition wherein the dietary fibre particles comprise water. Further aspects of the invention include the use of the composition to reduce saturated fatty acid content, a process for preparing the composition and a food product.

BACKGROUND OF THE INVENTION

There is interest in being able to increase the amount of dietary fibre consumed in people's diets. Although many consumers desire to increase the amount of dietary fibre they consume, food products providing appreciable levels of dietary fibre are often unappealing in terms of texture and mouthfeel. There is also interest in providing food products which are low in saturated fats. However, fats with low saturated fatty acid contents are generally soft in texture or liquid at room temperature. Such soft fats may cause undesirable textural modifications when incorporated into food products where harder fats are traditionally used.

SUMMARY OF THE INVENTION

An object of the present invention is to improve the state of the art and to provide an improved solution to overcome at least some of the inconveniences described above or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The object of the present invention is achieved by the subject matter of the independent claims. The dependent claims further develop the idea of the present invention.

Accordingly, the present invention provides in a first aspect a composition comprising a dispersion of dietary fibre particles in fat, wherein the dietary fibre particles have a particle size D50 of between 10 and 120 microns and comprise water at a weight ratio of dietary fibre to water of between 1:0.2 and 1:25. It should be noted that the weight ratio of dietary fibre to water is the weight of the dietary fibre as a ratio of the weight of water comprised within the dietary fibre.

In a second aspect, the invention relates to a food product comprising a composition comprising a dispersion of dietary fibre particles in fat, wherein the dietary fibre particles have a particle size D50 of between 10 and 120 microns and comprise water at a weight ratio of dietary fibre to water of between 1:0.2 and 1:25.

A third aspect of the invention relates to the use of a composition to reduce the saturated fatty acid content of a food product, wherein the composition comprises a dispersion of dietary fibre particles in fat, and wherein the dietary fibre particles have a particle size D50 of between 10 and 120 microns and comprise water at a weight ratio of dietary fibre to water of between 1:0.02 and 1:25.

A still further aspect of the invention is a process for preparing a composition according to the invention comprising the steps:
a. dispersing particles of dietary fibre in fat, wherein the dietary fibre particles have a particle size D50 of between 10 and 120 microns
b. adding water to the dispersion of particles of dietary fibre in fat while mixing the dispersion.

Adding dietary fibre particles to soft fats or oils increases their viscosity and, if added at a high enough level, can cause the oil to become paste-like, acting more like a hard fat in food products. However, such high levels of dietary fibre alter the mouthfeel of the fat considerably, leading to a dry and sometimes sandy texture. Also, dietary fibre particles can be difficult to disperse evenly. The inventors surprisingly found that by controlling the particle size of the dietary fibre particles they could increase the dispersability of the fibres, and by hydrating the dietary fibre, the particles swell and occupy a greater volume fraction. The hydrated particles provide a thickening effect to the oil at a lower level of dietary fibre and without leading to undesirable dry or sandy textures. Surprisingly, the addition of water enables a paste-like material to be formed with a lower weight % of disperse phase (fibre and water) than when fibre is used alone. Without wishing to be bound by theory, the inventors believe that this is due to increased disperse phase volume due to particle swelling, enhanced inter-particle interactions and the formation of water capillary bridges between particles. The inventors surprisingly found that there is an optimum range for the ratio of dietary fibre to water that provides the desired thickening, but avoids phase separation. With low levels of water, the particles do not swell sufficiently to provide a significant increase in viscosity. This leads to a dispersion that is not stable, the dietary fibres tend to sediment. However, with high levels of water, phase separation can occur. The dietary fibre is unable to take up the additional water and a water phase, independent of the fibre, is generated. Such a heterogeneous system is undesirable due to its unpredictable rheology.

When preparing laminated pastries, the inventors were surprised to find that the thickening effect of dietary fibres in oil, for example water-swelled dietary fibres in oil, was sufficient to allow replacement of traditional fats such as butter with low saturated fat oils. For example, butter could be replaced by a mixture of high oleic sunflower oil (HOSFO) and water-swelled potato fiber.

DETAILED DESCRIPTION OF THE INVENTION

Figure 1:
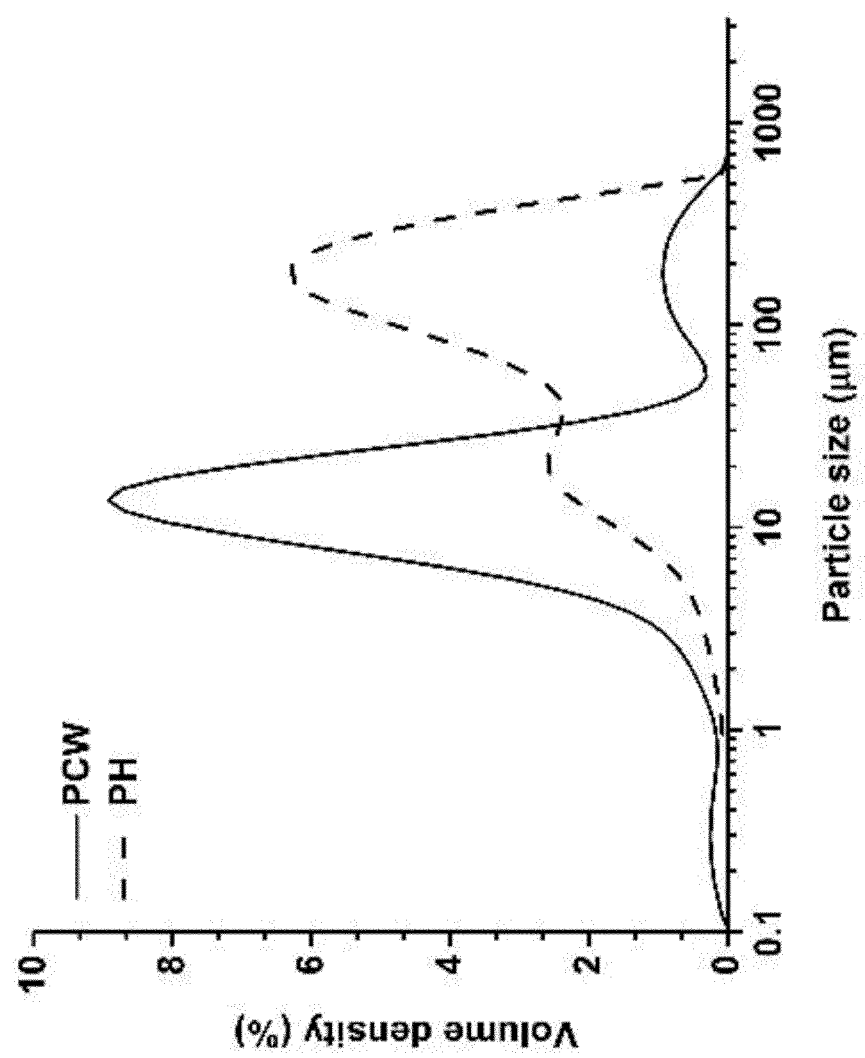
FIG. 1 shows the particle size distribution volume density (%) as function of particle size distribution (μm) for pea cell wall fibre and pea hull fibre.

Consequently the present invention relates in part to a composition comprising a dispersion of dietary fibre particles in fat, wherein the dietary fibre particles have a particle size D50 of between 10 and 120 microns (for example between 20 and 90 microns, for example between 10 and 70 microns, for example between 10 and 50 microns, for example between 10 and 40 microns, for further example between 10 and 30 microns) and comprise water at a weight ratio of dietary fibre to water of between 1:0.02 and 1:25 (for example between 1:0.05 and 1:20, for example between 1:0.2 and 1:15, for example between 1:0.3 and 1:10, for further example between 1:0.5 and 1:3). The particle size D50 may be the median of a volume distribution (Dv50) measured by laser light scattering, for example a laser light scattering measurement of a sample dispersed in oil. Dietary fibres are non-starch polysaccharides and lignin. For example, dietary fibres may be oligo- and polysaccharides and their derivatives wherein at least 40 wt. % cannot be decomposed to absorbable components in the upper alimentary tract by human digestive enzymes. The dietary fibres according to the present invention may be obtained from plants, for example vegetables, pulses, cereals or fruits, or from microorganisms (e.g. algae). In an embodiment, the dietary fibres may be obtained from plants selected from the group consisting of vegetables, pulses and fruits. Pulses are the seeds of leguminous crops (e.g. pea, lentils, chickpeas, beans) and represent an important food source of protein and dietary fibres. Most of the fibres in pulses are found in the hull (or seed coat) which is currently a by-product of both flour and protein extract production. Pulses also contain 'inner fibres' which are found in the cotyledon and constitute a structural part of the plant cell wall material. The terms vegetables and fruits are used in the current specification in the culinary sense of the words. Fruits are the fleshy seed-associated structures of a plant that are sweet and edible in the raw state, such as apples, oranges, grapes, strawberries and bananas. This includes fruits from cultivated varieties of plants which produce seedless fruits. The dietary fibre particles according to the present invention may be fibrillar in shape, for example they may have a shape such that they are significantly longer than they are wide.

The particle size D50 is used in the conventional sense as the median of the particle size distribution. Median values are defined as the value where half of the population resides above this point, and half resides below this point. The D50 is the size in microns that splits the distribution with half above and half below this diameter. The particle size distribution may be measured by laser light scattering, microscopy or microscopy combined with image analysis. For example, the particle size distribution may be measured by laser light scattering. Since the primary result from laser diffraction is a volume distribution, the D50 cited is the volume median (sometimes written as Dv50).

The process of water uptake by the fibre can occur either at the surface or in the bulk of the fibre. Preferably the dietary fibre particles comprising water have been swelled by the water, with water uptake predominantly in the bulk. The water uptake of the fibres can be characterized by sorption isotherm measurements. Sorption isotherm measurements record water uptake with increasing relative humidity. Dietary fibre particles capable of taking up significant amounts of water under conditions of 100% humidity work well in the current invention. In an embodiment, the dietary fibre particles are selected such that they would reach a water content greater than 15 wt. % after 48 hours in an environment of 100% relative humidity and 25° C. For example they would reach a water content between 15 and 300 wt. % after 48 hours in an environment of 100% and 25° C., for further example they would reach a water content between 20 and 50 wt. % after 48 hours in an environment of 100% relative humidity and 25° C.

The dietary fibre according to the invention may be selected from the group consisting of pea fibre (such as pea hull fibre or pea cell wall fibre), lentil fibre, fava bean fibre, lupin fibre, chick pea fibre, black bean fibre, potato fibre, carrot fibre, beetroot fibre, pumpkin fibre, kale fibre, psyllium fibre, apple fibre, citrus fibre (such as cellulose rich fractions of citrus fibre or pectin rich fractions of citrus fibre), oat bran, maize bran, rice bran, barley bran, wheat bran, fibre from microorganisms and combinations of these. For example, the dietary fibre may be selected from the group consisting of pea fibre, lentil fibre, fava bean fibre, lupin fibre, chick pea fibre, black bean fibre, potato fibre, carrot fibre, beetroot fibre, pumpkin fibre, kale fibre, apple fibre, citrus fibre and combinations of these. For example, the dietary fibre may be selected from the group consisting of pea fibre, lentil fibre, fava bean fibre, lupin fibre, chick pea fibre, black bean fibre, potato fibre, carrot fibre, beetroot fibre, pumpkin fibre, kale fibre and combinations of these. For further example, the dietary fibre may be selected from the group consisting of pea fibre, potato fibre, carrot fibre and combinations of these. For still further example the dietary fibre may be selected from the group consisting of pea hull fibre, pea cell wall fibre and carrot fibre. Dietary fibre from these sources has good dispersibility and water swelling properties. The dietary fibre according to the invention may comprise cellulose, for example the dietary fibre may comprise at least 20 wt. % cellulose. The dietary fibre according to the invention may comprise hemicellulose, for example the dietary fibre may comprise at least 20 wt. % hemicellulose. The dietary fibre according to the invention may comprise pectin, for example the dietary fibre may comprise at least 20 wt. % pectin.

In an embodiment of the invention, the weight of dietary fibre is between 0.5 and 50 of the weight of fat (for example between 5 and 40% of the weight of fat, for further example between 10 and 35% of the weight of fat). For highly swellable fibres, a lower weight of dietary fibre may achieve the desired thickening.

In an embodiment of the invention a solute is dissolved in the water. Solutes will serve to reduce the water activity of the composition. Control of water activity may reduce or prevent microbial growth. Where the composition is a component of a product such as a food product, controlling water activity may be important to prevent moisture migration to other components of the product. The solutes dissolved in the water may be salts, for example sodium chloride or potassium chloride, which are particularly suitable for culinary applications.

In the context of the present invention, the term fat refers to triglycerides. Fats are the chief component of animal adipose tissue and many seeds. Fats which are generally encountered in their liquid form are commonly referred to as oils. In the present invention the terms oils and fats are interchangeable. The fat comprised in the composition of the invention may have a solid fat content of less than 50% at 20° C., for example less than 30% at 20° C., for further example less than 10% at 20° C., for further example less than 1% at 20° C., for still further example 0% at 20° C. The solid fat content may be measured by pulsed NMR, for example according to the IUPAC Method 2.150 (method for routine use without special temperature pretreatment). [Standard Methods for the Analysis of Oils, Fats and Derivatives, 7th Edition (1987)].

The fat according to the invention may have a saturated fatty acid (SFA) content below 50%, for example below 35%, for example less than 25%, for further example less than 20%. In the context of the invention, the quantity of saturated fatty acids includes fatty acids that are part of fat molecules, indeed it is not expected that the composition of the invention would have an appreciable level of free fatty acids. SFA content expressed as a percentage is the weight percentage of saturated fatty acids over all fatty acids. Fats with low SFA content typically have low viscosities. Such fats are not suitable for many applications where harder fats such as butter or shortenings are traditionally used. By dispersing dietary fibre particles comprising water, according to the invention, the viscosity of the fat is increased, and it can be used to replace harder fats in food products. Consumption of saturated fatty acids have been linked to increased levels of LDL cholesterol in the blood and heart diseases and so it is advantageous to be able to reduce the consumption of saturated fatty acids.

The fat according to the invention may comprise (for example consist of) fats selected from the group consisting of high oleic sunflower oil, high oleic safflower oil, high oleic soybean oil, high oleic rapeseed oil such as high oleic canola oil, algal oil (for example high oleic algal oil), olive oil, macadamia nut oil, hazelnut oil, avocado oil, sunflower oil, rapeseed oil, soybean oil, grape-seed oil, cotton-seed oil, corn oil and combinations of these.

The composition of the invention may comprise a surfactant, for example a surfactant selected from the group consisting of lecithin; mono- and di-glycerides; derivatives such as acetylated, succinylated and diacetylated tartaric esters of distilled monoglycerides; lactylated esters; sorbitan esters; polysorbates; propylene glycol esters; sucrose esters; polyglycerol esters and combinations of these. The addition of a surfactant such as polyglycerol polyricinoleate (PGPR) can be used to adjust the viscosity of the composition. For example, adding 2.5% PGPR to a 15 wt. % pea cell wall (PCW) fibre dispersion in sunflower oil with PCW:water ratio of 1:0.5 or 1:1 leads to a strong decrease in viscosity. This is believed to be due to breaking of aggregates between PCW particles. However, the composition of the invention does not need to comprise a surfactant. The water in the composition is primarily associated with the dietary fibre, in contrast to a water-in-oil emulsion with dispersed water droplets stabilized by surfactant (e.g. an emulsifier). In an embodiment of the invention, at least 90 wt. % of the total water of the composition is absorbed into or adsorbed onto the dietary fibre, for example at least 95 wt. %, for further example at least 98 wt. %. The composition of the invention may have an total water content greater than 3 wt. %, for example greater than 5 wt. %, for further example greater than 7 wt. %.

The composition of the invention may be a food product or a non-food product (such as a cosmetic product e.g. a skin cream), or the composition may be comprised within a food product or a non-food product. The composition of the invention may be a food material. The composition of the invention may be edible. In a further aspect, the invention provides a food product comprising the composition of the invention. The food product may be a product for humans or animals, for example companion animals. The food product may be a ready-to-cook food product, for example for the consumer to cook at home or for a food outlet employee to cook before sale.

The composition of the invention is able to partially or completely replace butter, hard fats and shortenings in many food applications. The food product of the invention may be a pastry or dough-based product. The food product of the invention may be a laminated pastry product. The composition of the invention may be an ingredient of the pastry, or it may for example be comprised in a bakery filling. The food product of the invention may be a confectionery product, for example the composition of the invention may be used to replace some or all of the fat in the filling of a chocolate sweet or praline. The food product of the invention may be a frozen confectionery product, for example the composition of the invention may be used to replace some or all of the fat in the filling or coating of an ice cream product. In an embodiment, the food product of the invention may be a chilled or frozen ready-to-cook product.

The food product of the invention may be a ready-to-cook laminated pastry product, for example a ready-to-cook puff pastry (including quick puff pastry), croissant or Danish pastry. Laminated pastries have been manufactured since at least the Middle Ages. Laminated pastries such as puff pastry are constructed of large, extended, thin sheets of dough, the dough being coated and separated by fat. The layers of the laminated pastry typically expand when cooked, leaving large air pockets inside. Laminated pastries require fats that are solid but malleable at cool room temperature such as butter, lard and vegetable shortenings. These fats are relatively high in saturated fats. Replacing butter, lard or shortenings in laminated pastries with lower SFA (and therefore softer) vegetable fats is unsatisfactory. The softer fats do not survive the process of lamination and do not maintain the required separation of the layers. In many cases, the soft fat diffuses into the dough and/or runs out from between the layers. The composition of the invention may successfully be used as the fat in a laminated pastry even when the fat in the composition is a soft fat, for example a fat low in saturated fatty acids. Dispersing dietary fibre particles (in particular dietary fibre particles comprising water) in a soft fat increases its viscosity, for example it may increase its viscosity to a level where the soft fat functions like a hard fat and can be used in lamination. Where water is comprised in the fibre particles it turns to steam when the pastry is baked, and this helps produce defined layers in the laminated pastry.

An aspect of the invention provides a laminated pastry product comprising a plurality of thin sheets of cooked pastry dough, the sheets of cooked dough being separated by a composition comprising fat (for example fat having a saturated fatty acid content below 35 wt. %) and dietary fibre particles, the dietary fibre particles having a particle size D50 of between 10 and 120 microns (for example between 20 and 90 microns, for example between 10 and 70 microns, for example between 10 and 50 microns, for example between 10 and 40 microns, for further example between 10 and 30 microns). In the context of the present invention, the term thin refers to having a thickness of less than 2 mm, for example less than 1 mm, for further example less than 0.5 mm. Pastry dough is a thick malleable mixture, traditionally comprising flour and liquid, for baking into pastry. The laminated pastry product may be a chilled or frozen ready-to-cook product. The laminated pastry product may be a product sold ready to consume. Surprisingly, dietary fibre which has been reduced in particle size provides an improved laminated pastry product when it is included in the fat composition separating the sheets of dough. A laminated pastry product made with un-milled fibre in the fat composition separating the sheets of dough had a 30% reduction in final volume compared to an otherwise identical product made with milled fibre (Example 4). The addition of water to the fibre particles provides further advantages as discussed above, for example the formation of a paste like material in liquid oils at a lower level of disperse phase.

Laminated pastry such as puff pastry is generally used as a contrasting container for a moist filling, whether savoury or sweet. The container may be open, as in tarts and open-faced pies, closed as in double-crust pies, or fully enclosed as in turnovers and filled sandwiches such as the Nestlé HOT POCKETS® product. A filling may be enclosed by laminated pastry in the laminated pastry product of the invention, the filling being selected from the group consisting of a sweet filing, a savoury filling, and combinations thereof. The ready-to-cook food product may be a savoury turnover.

Commercially, food products such as laminated pastry products are provided to consumers in a number of forms. Laminated pastry may be sold as a chilled or frozen pastry in an un-cooked state, for example for the consumer to use at home to prepare their own dishes. The laminated pastry product of the invention may be stored at a temperature of −40° C. to +10° C. The laminated pastry product may be partially baked, for example the laminated pastry may be partially baked before or after being stored at a temperature of −40° C. to +10° C.

An aspect of the invention provides for the use of the composition of the invention to reduce the saturated fatty acid content of a food product. The invention may provide for the use of the composition of the invention to reduce the saturated fatty acid content of a laminated pastry, for example a reduction in the overall saturated fatty acid content of at least 40%. A further aspect of the invention is the use of dietary fibre particles having a particle size D50 of between 10 and 120 microns (for example between 20 and 90 microns, for example between 10 and 70 microns, for example between 10 and 50 microns, for example between 10 and 40 microns, for further example between 10 and 30 microns) and comprising water at a weight ratio of dietary fibre to water of between 1:0.02 and 1:25 to structure fat, wherein the fat has a solid fat content of less than 50% at 20° C., for example less than 30% at 20° C., for further example less than 10% at 20° C., for further example less than 1% at 20° C., for still further example 0% at 20° C.

Another aspect of the invention provides a process for preparing the composition of the invention comprising the steps:
   a. dispersing particles of dietary fibre in fat (for example liquid fat), wherein the dietary fibre particles have a particle size D50 of between 10 and 120 microns (for example between 20 and 90 microns, for example between 10 and 70 microns, for example between 10 and 50 microns, for example between 10 and 40 microns, for further example between 10 and 30 microns); and
   b. adding water to the dispersion of particles of dietary fibre in fat (for example liquid fat) while mixing the dispersion.

One or more solutes (for example salts) may be dissolved in the water before being added to the dispersion of particles.

In another aspect of the method of the invention, provides a process for preparing the composition of the invention comprising the steps:
   a. humidifying particles of dietary fibre having a particle size D50 between 10 and 120 microns (for example between 20 and 90 microns, for example between 10 and 70 microns, for example between 10 and 50 microns, for example between 10 and 40 microns, for further example between 10 and 30 microns) such that the dietary fibre particles after humidification comprise water at a weight ratio of dietary fibre to water of between 1:0.2 and 1:2 and;
   b. dispersing the humidified dietary fibre particles in fat (for example liquid fat).

Humidification may be performed by adding liquid water or subjecting the dietary fibre to water vapour. With the addition of a small amount of water the dietary fibre particles form a crumbly, semi-dry material which can be dispersed in liquid fat. However, it is more convenient to disperse the dietary fibre in oil first and then add water, where the whole process can be performed in one stirred vessel. Dispersing dietary fibre in a large excess of water to form a liquid aqueous dispersion and then adding oil to the dispersion is unsatisfactory. The oil forms a separate phase which few particles of dietary fibre enter, resulting in a heterogeneous mixture.

In a still further aspect the invention provides a process for making laminated pastry comprising the steps
   a. dispersing particles of dietary fibre in fat, wherein the dietary fibre particles have a particle size D50 of between 10 and 120 microns (for example between 20 and 90 microns, for example between 10 and 70 microns, for example between 10 and 50 microns, for example between 10 and 40 microns, for further example between 10 and 30 microns);
   b. forming pastry dough into a sheet;
   c. applying a layer comprising the dispersion of step a to the dough sheet to form a combined sheet; and
   d. folding and compressing the combined sheet at least twice to form a laminated pastry.

In an embodiment, flour may be added to the dispersion of particles of dietary fibre in fat. In a further embodiment, water may be added to the dispersion of particles of dietary fibre in fat while mixing the dispersion, for example the water may be added dropwise.

A further embodiment of the invention is the laminated pastry obtainable by the process for making laminated pastry of the invention.

Those skilled in the art will understand that they can freely combine all features of the present invention disclosed herein. In particular, features described for the composition of the present invention may be combined with the process of the present invention and vice versa. Further, features described for different embodiments of the present invention may be combined. Where known equivalents exist to specific features, such equivalents are incorporated as if specifically referred to in this specification.

Further advantages and features of the present invention are apparent from the figures and non-limiting examples.

EXAMPLES

Example 1: Oil-Continuous Dispersions of Pea Fibres

Fibres

Two different Fiber-Rich Pea Fractions; Pea cell wall (PCW) and Pea hull (PH) were obtained from Cosucra (Belgium) via fractionation of yellow peas. PCW and PH had initial particle size distributions below 500 μm (80% volume) and below 300 μm (85% volume), respectively (data provided by Cosucra®). The macro composition of the two FRPF is shown in the table below.

|  | PCW (wt. %) | PH (wt. %) |
|---|---|---|
| Fibre | 48 ± 3 | 85 |
| Starch | 36 | 5 |
| Protein | 7 | 6.5 |

The fibre-rich pea fractions were jet milled with a single pass at constant pressure of 10 Bars and a feeding rate 0.5 kg/h. The jet-milled fibre-rich pea fractions will subsequently be referred to as FRPF.

Particle Size Distribution

Particle size distribution was measured in dry conditions using laser scattering Mastersizer (Malvern 3000). Refractive index, adsorption index and density used were respectively 1.544, 0.1 and 1.5, which correspond to the values for pure cellulose (provided by Mastersizer Malvern 3000). The analysis was performed in triplicate, with a feeding rate of 60% (±10%) in order to achieve a laser obscuration between the 3 and 7%. Several pressures (1.6 up to 3.2 Bar) were tested to displace the powder towards the venturi system. Since no difference was monitored upon the change in pressure, a reference pressure of 3.2 Bar was used. The resulting particle size distributions are shown in FIG. 1. Despite having experienced the same milling conditions, PCW exhibits monomodal particle size distribution (peak at ≈13.6 μm) and a D50=25.3 μm whereas PH shows a D50=15.2 μm and a bimodal distribution. These differences may be attributed to the different starch/fiber ratio of the initial fibre materials. The highly crystalline cellulose, which constitutes the major fiber component in PH, is expected to provide increased mechanical strength, conferring a higher fracture point compared to PCW.

Hygroscopic Properties

The hygroscopic properties of the FRPF materials (isothermal equilibrium between moisture content and water activity ($a_w$)) were measured as follows. In order to achieve different values of $a_w$, 2.5 g of PH and PCW were homogenously placed in 6 cm (diameter) dishes and stored at 25° C. in a desiccator at different relative humidity (RH). Samples at $a_w$<0.5 were obtained via equilibration (48 h) with a RH imposed by saturated salt solutions. Samples at $a_w$>0.5 were obtained by partial equilibration with a RH of 100% imposed via Milli-Q water. After 2, 4, 8, 10, 16, 24 and 48 h the samples were removed from the desiccator and carefully sealed in hermetic bags to prevent moisture loss. Thermogravimetry and the differential thermal analysis allow to calculate the weight loss under a dry nitrogen flow. The samples were placed in open pans (25 mg±5) and heated at 2° C./min from 25 to 200° C. The weight loss was calculated from the thermo-gravimetric curves (weight vs temperature) in the region of plateau before a further weight loss due to thermal degradation.

Figure 2:
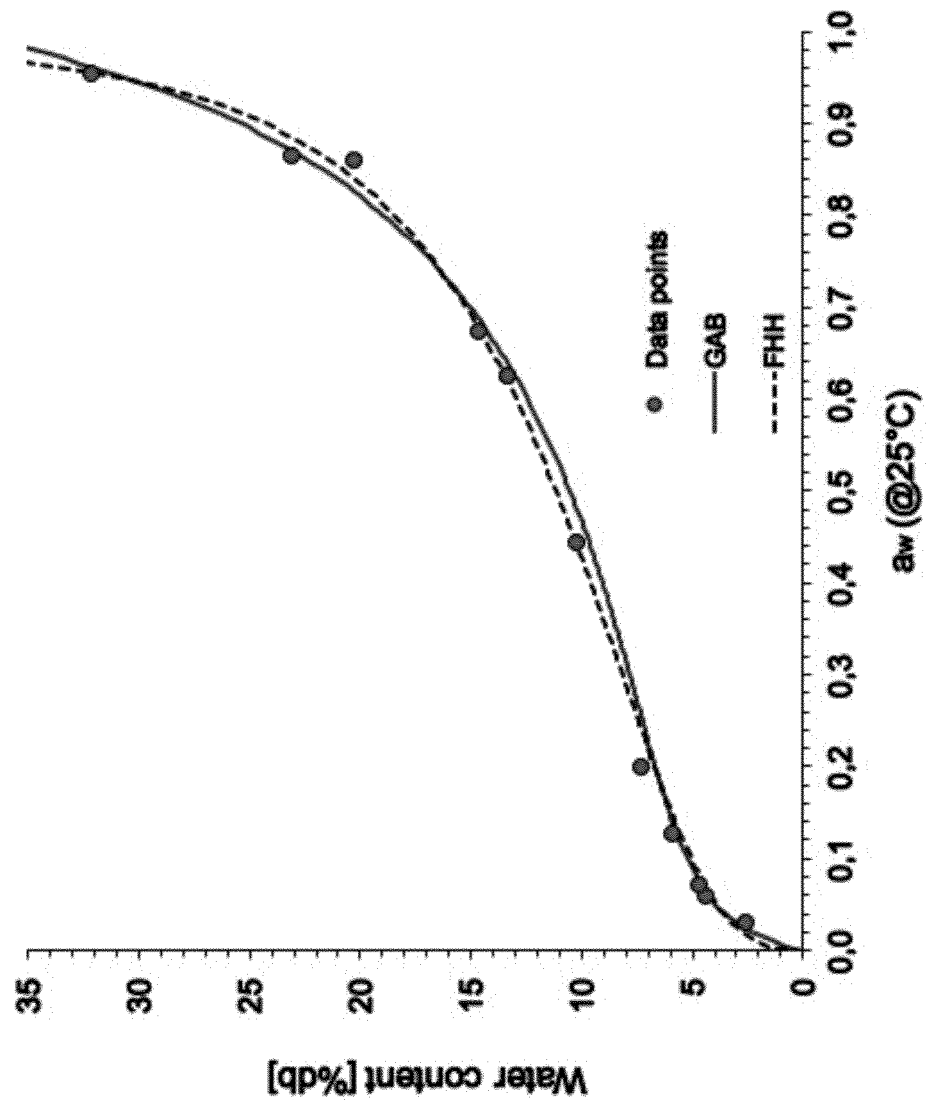
FIG. 2 shows sorption isotherms for pea cell wall fibre. The GAB (filled line) and the fractal FHH (dotted line) models are used to fit the experimental data points.
Figure 3:
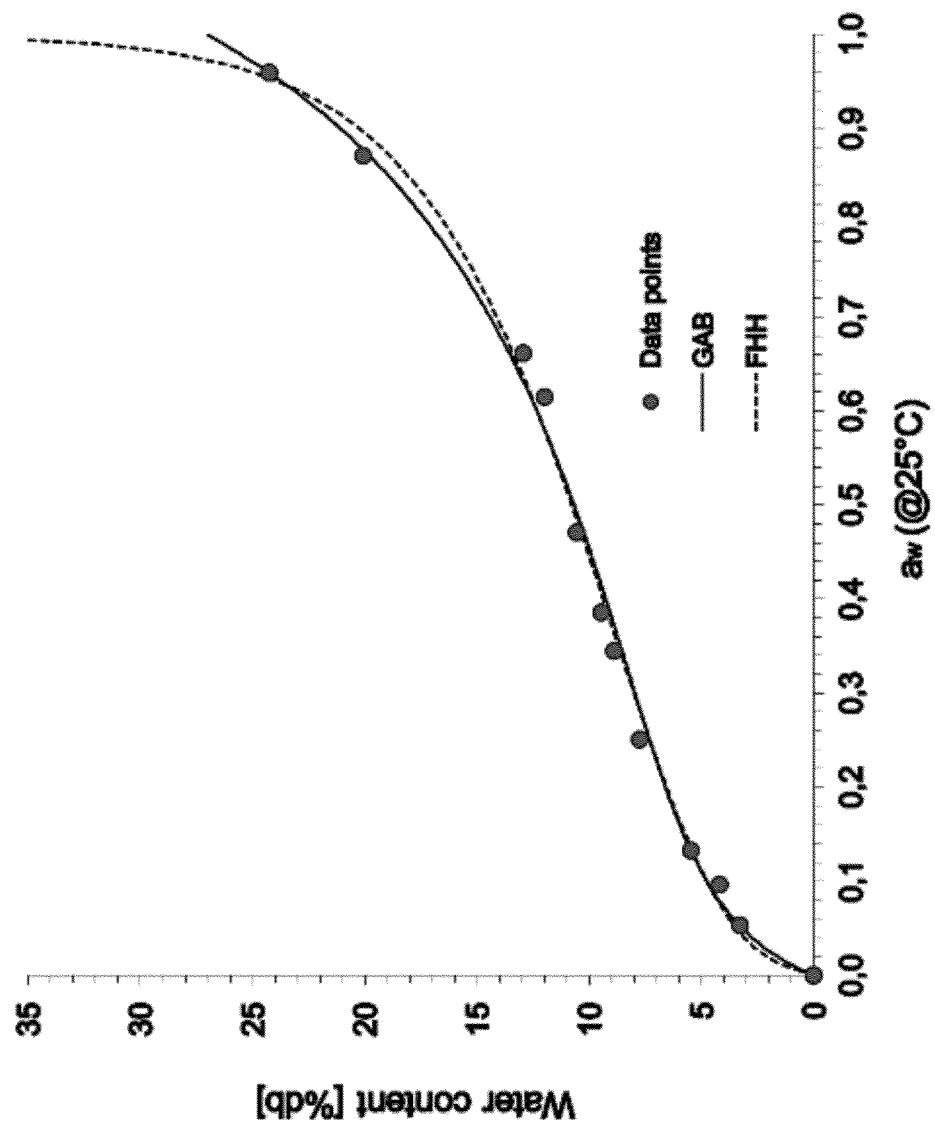
FIG. 3 shows sorption isotherms for pea hull fibre. The GAB (filled line) and the fractal FHH (dotted line) models are used to fit the experimental data points.

The $a_w$ was measured in continuous mode using the aw-meter Aqualab (Series 4TE, Decagon). Approximately 1 g of sample was homogenously placed in the measuring cup and lodged in the water activity meter chamber. Afterwards, the following temperature cycle was performed to ensure full distribution of the water throughout the sample: (a) 1 h at 25° C., (b) 2 h at 60° C. and (c) 25° C. for the time required to reach equilibration. The sample was considered to be in equilibrium when the variation of $a_w$ in a time span of 15 min was within an accuracy of ±0.003. Equilibrated values of $a_w$ were used to plot sorption isotherms for PCW shown in FIG. 2 and PH shown in FIG. 3.

The Guggenheim-Anderson-de Boer model (GAB) and the fractal Frenkel, Halsey, Hill model (FHH) were used to fit the experimental data. While the GAB model assumes a multilayer coverage on a flat surface, the fractal FHH accounts for particle surface irregularities where the fractal number (D) is introduced (D=2 corresponds to flat particle surface and for D=3 to a maximally convoluted surface).

A good fit was found for both GAB and FHH models with a $R^2$ 0.992. A slightly better fit was provided by the fractal FHH model for the PCW whereas the GAB model fitted the best for the PH. The D values obtained by the fractal FHH model were 2.38 and 2.99 for PCW and PH respectively. The process of water uptake can occur either on the surfaces or in the bulk of the material and it is dependent on surface area, pore volume as well as fibre composition. That particles need relatively high water content to approach an $a_w$ of 1 indicates that the process predominantly occurs in the bulk by capillary action rather than on the surface. This behavior is more prominent for the Pea Cell Wall particles which exhibit a water content of 35% compared to the 24.3% of the Pea Hulls. This difference in water uptake which will affect swelling behavior are the result of the properties of their individual biopolymer components and the physical structure (porosity) of the particles. The presence of starch confers Pea Cell Wall an increased number of accessible hydroxyl groups (i.e. capable of forming hydrogen bonds with water). Pea Cell Wall also contains small amount of pectin with carboxyl groups capable of forming ionic interactions involving strongly held water molecules in the presence of cations. Pea Hull is mostly composed of secondary walls, rich in crystalline cellulose hence giving a reduced hygroscopic response. Water uptake in cellulose occurs due to hydrogen bonding by its amorphous regions and hence it decreases with increasing crystallinity.

Dispersions in Oil

The FRPF were dispersed in sunflower oil at determined concentrations and stirred at room temperature for 1 h. Particle density was used to calculate volume fraction ($\phi$) for the FRPF-in-oil dispersions, on the assumption that particles do not swell in oil. Density values, obtained using AccuPyc, were 1.53 and 1.45 g/cm$^3$ for the PH and PCW respectively.

Figure 4:
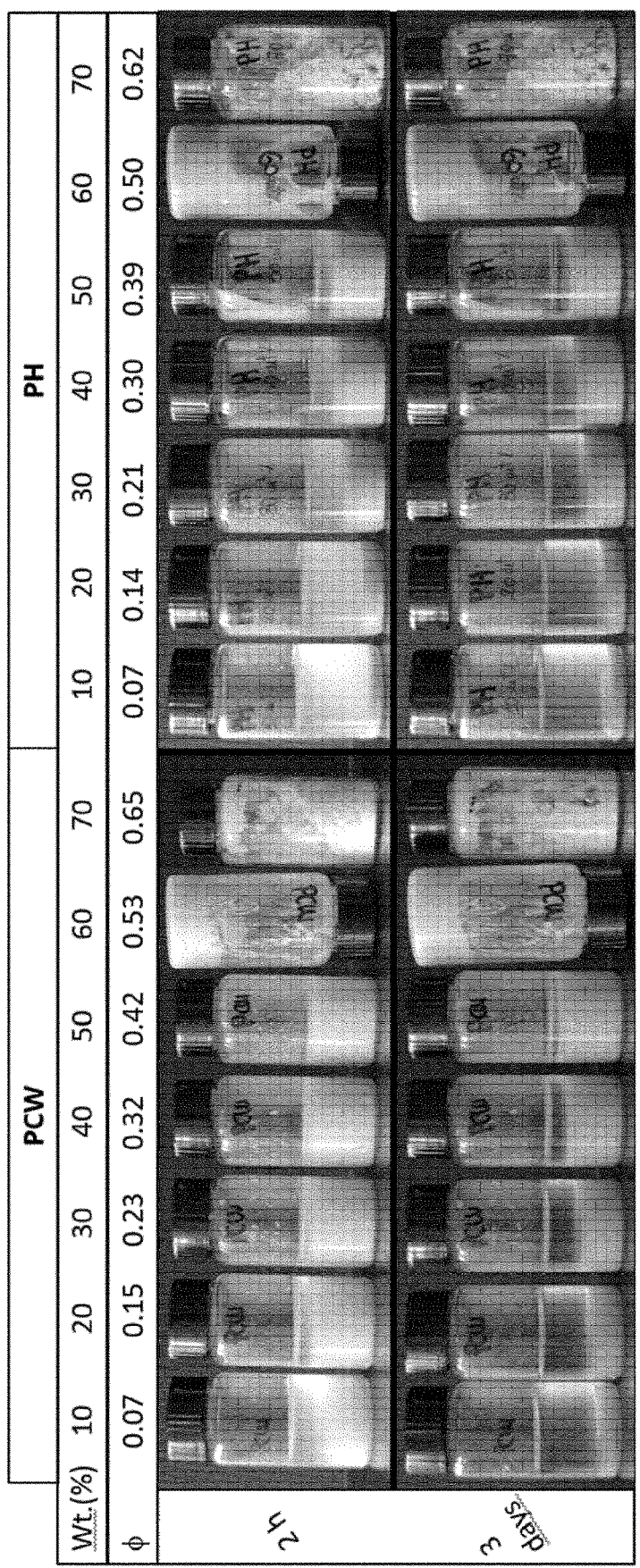
FIG. 4 shows images of dispersions of jet-milled fibre-rich pea fractions (FRPF) in oil

Images of FRPF-in-oil dispersions are shown in FIG. 4 where increasing $\phi$ leads to an increase in the sediment height. Corresponding wt. % of fibre are also shown. After 2 h from sample preparation, the oil phase remains turbid as small particles require longer time to sediment. After 3 days of storage at 4° C., the dispersions show a clear oil phase due to the complete sedimentation of the particles. At 60 wt. % fibre, the highly viscous dispersions do not exhibit oiling-out effect. At such value of $\phi$), the PH-in-oil dispersion started to flow when the tube was turned upside down, which was not shown for the PCW dispersion over a time span of 2 minutes. At the highest value of $\phi$ (0.65 and 0.62 respectively for PCW and PH), the oil content is not sufficient to fill the voids between particles which correspond to $\phi$ values greater than $\phi_{max}$.

Rheological measurements were performed for the FRPF dispersions in a stress-controlled rheometer (MCR 502, Anton Paar) with a sandblasted concentric cylinder geometry (CC17/TI/S-SN38492). The samples were transferred through a pipette with a cut-off tip to ensure no plug of the pipette. In the case of highly viscous material the sample loading was gently performed with a spatula. All measurements were performed at 20° C.

Viscosity was measured as function of shear rate at a range of volume fractions with torque values greater than 1 μNm. The increase in viscosity at high shear rate values (>100 s$^{-1}$) was attributed to turbulence effect and therefore neglected for analysis. A 1 minute of pre-shear at a constant shear rate of 1 s$^{-1}$ was applied in order to ensure all samples were subjected to the same deformation history. Viscosity measurements consisted of shear rate ramps from 1×10$^{-5}$ to 3×10$^3$ s$^{-1}$ over a time span of 6 min. In order to evaluate any possible the time-dependent shear thinning behavior, a loop test was performed, consisting of an increase of shear rate from zero up to a maximum value, followed by a decrease to zero shear rate in the same way. The 6 min shear rate span was tailored for each dispersion.

Figure 5:
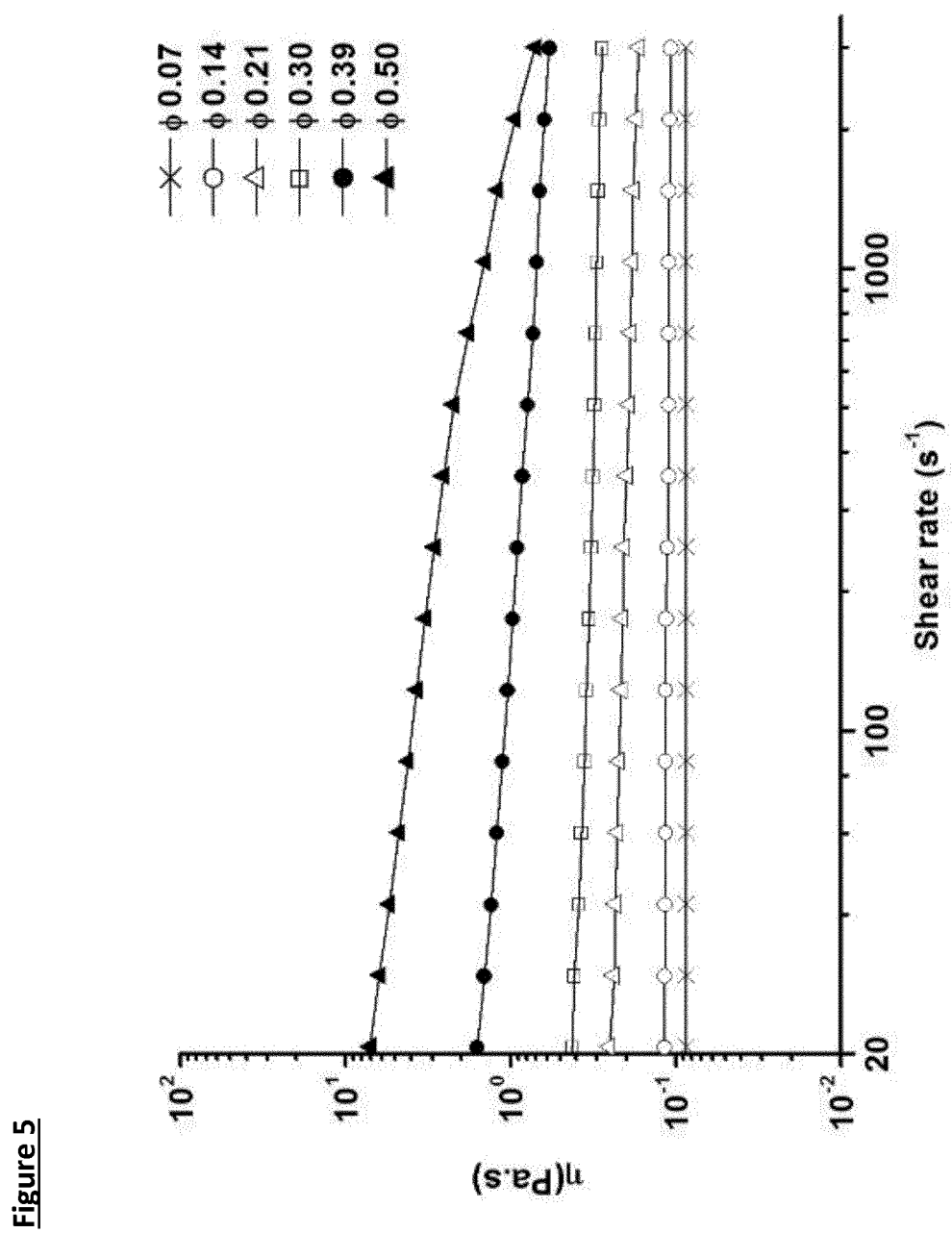
FIG. 5 is a plot of shear viscosity as function of shear rate for pea hull (PH) oil dispersions at a range of volume fractions (φ)
Figure 6:
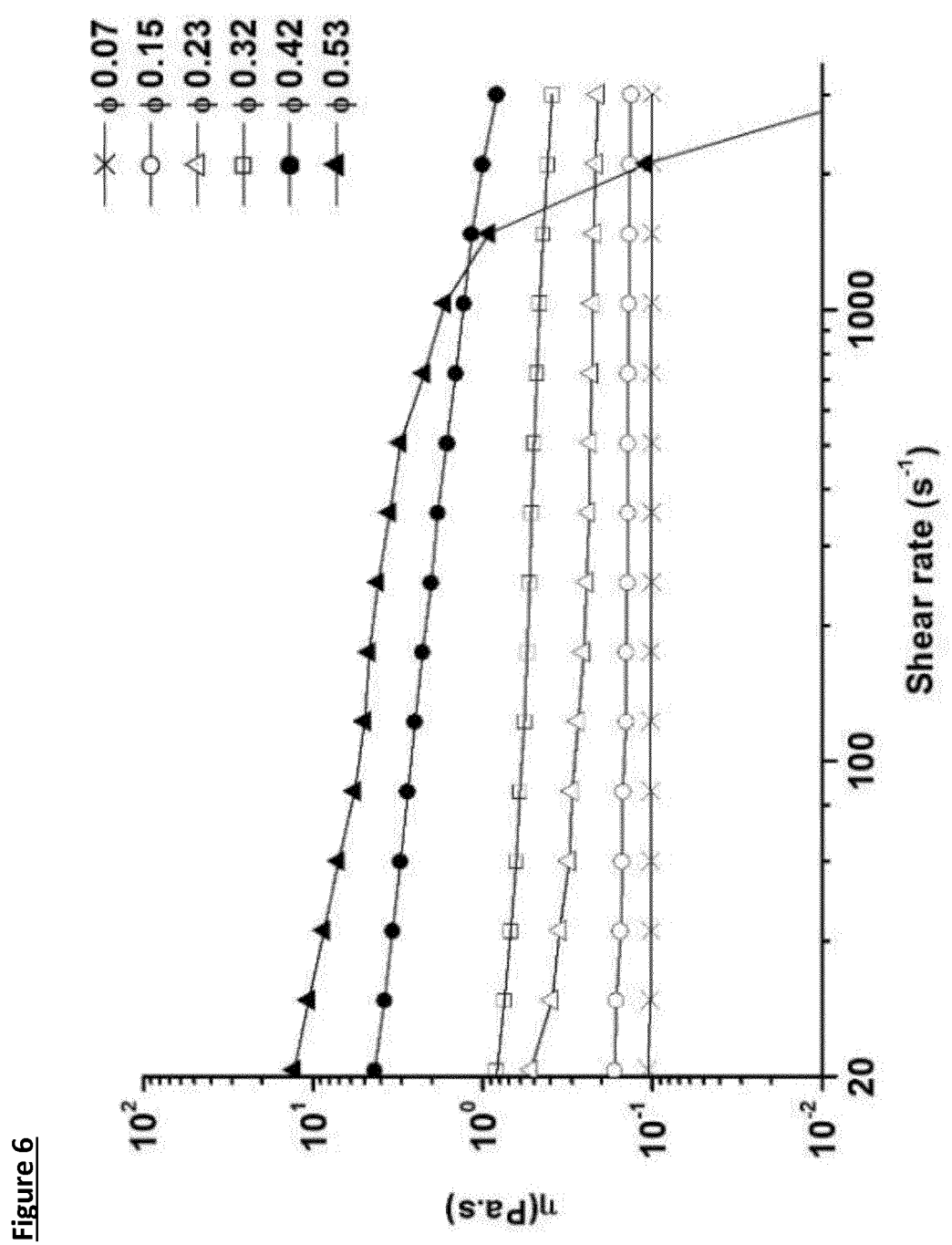
FIG. 6 is a plot of shear viscosity as function of shear rate for pea cell wall (PCW) oil dispersions at a range of volume fractions (φ)

FIGS. 5 and 6 shows how the shear viscosity of the FRPF-in-oil dispersion varies at concentrated regimes. Systems at $\phi \leq 0.32$ show a Newtonian behavior while at $\phi \geq 0.32$ shear thinning profile. The sharp decrease in viscosity of the PCW-in-oil dispersion at $\phi$ of 0.53 (FIG. 6 at shear rates >600 s$^{-1}$) was due to wall slip.

Addition of Water

Structuring high oleic sunflower oil by adding water to the particulate oil dispersions was investigated. For simplicity, we refer to the dispersions as 15 and 30 wt % particles in oil (with 85 and 70 wt % oil respectively) before, but also after, water addition. The procedure was carried out as follows: the FRPF were first dispersed in sunflower oil at 15 wt % and 30 wt % and stirred at room temperature for 1 h. Controlled amounts of Milli-Q water were then added to the FRPF-in-oil dispersions under vigorous magnetic stirring at a FRPF:Water ratio within 1:0.1-1:4 range.

Figure 7:
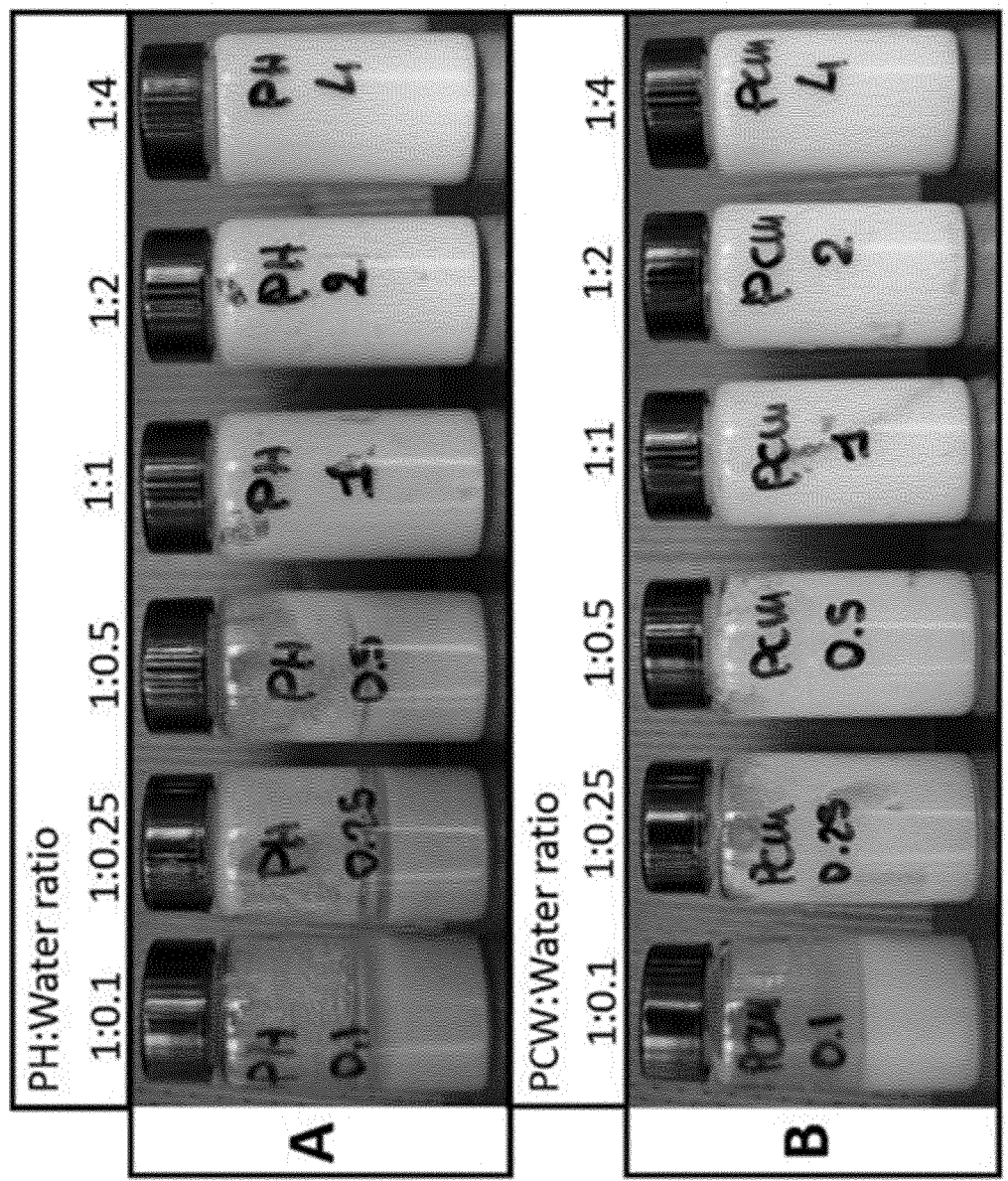
FIG. 7 shows 30 wt % PH and PCW dispersions with added water as a function of the PH:water and PCW:water ratios. The pictures were taken at 20° C., 1 h after the sample preparation.

The 30 wt % oil dispersions with were visually analyzed as function of the PCW:Water ratio and PH:water ratio respectively (FIG. 7). All dispersions show a whitening effect with increasing water content, which is assigned to the presence of oil droplets. The 30 wt. % dispersions form a thick paste as the water content is increased above 1:0.5 FRPF:water. In contrast, dispersions of the same dietary fibres without water required 60 wt % of fibre to form a paste (see FIG. 4).

Figure 8:
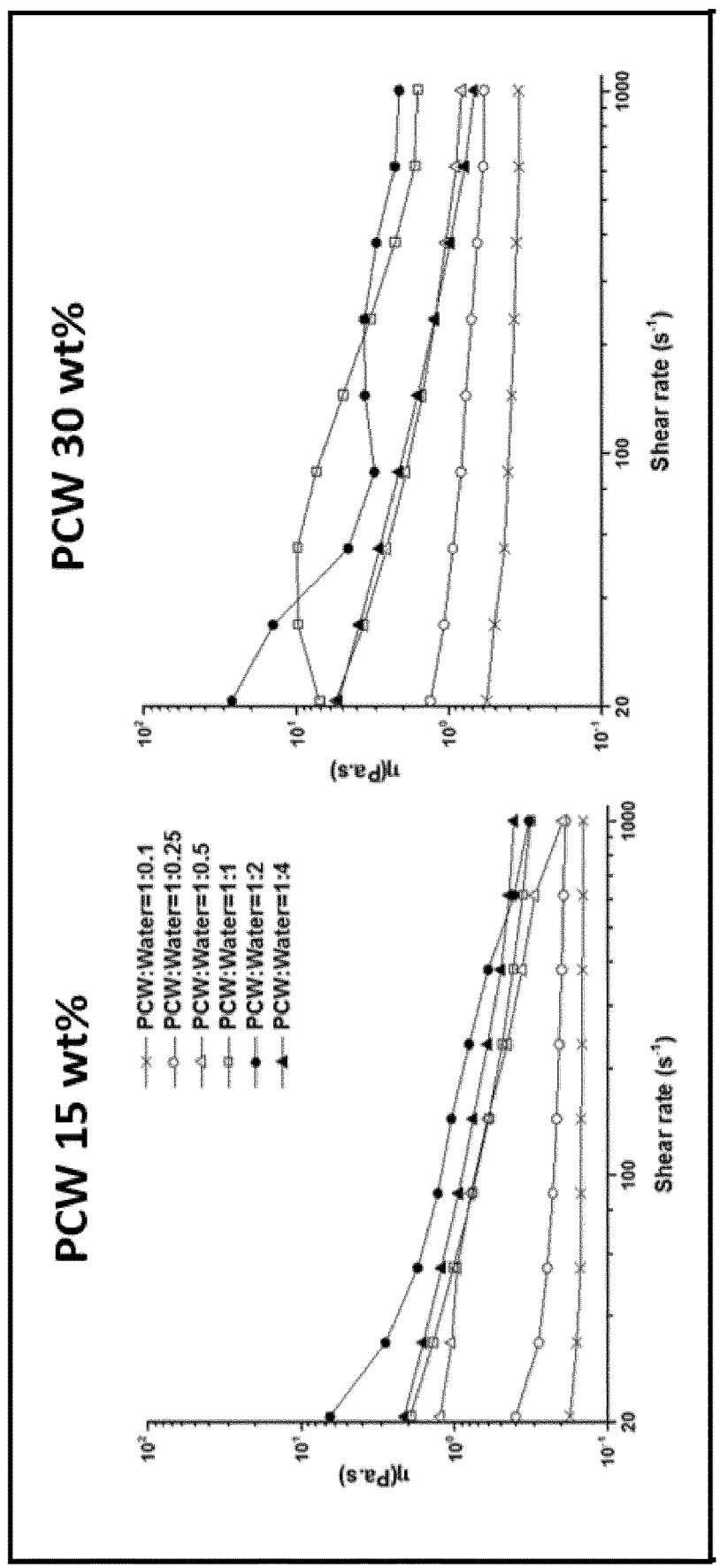
FIG. 8 shows plots of viscosity (Pa*s) as a function of shear rate ($s^{-1}$) for a PCW-in-oil dispersion (15 wt. % on left, 30 wt. % on right) at different PCW:water ratios.
Figure 9:
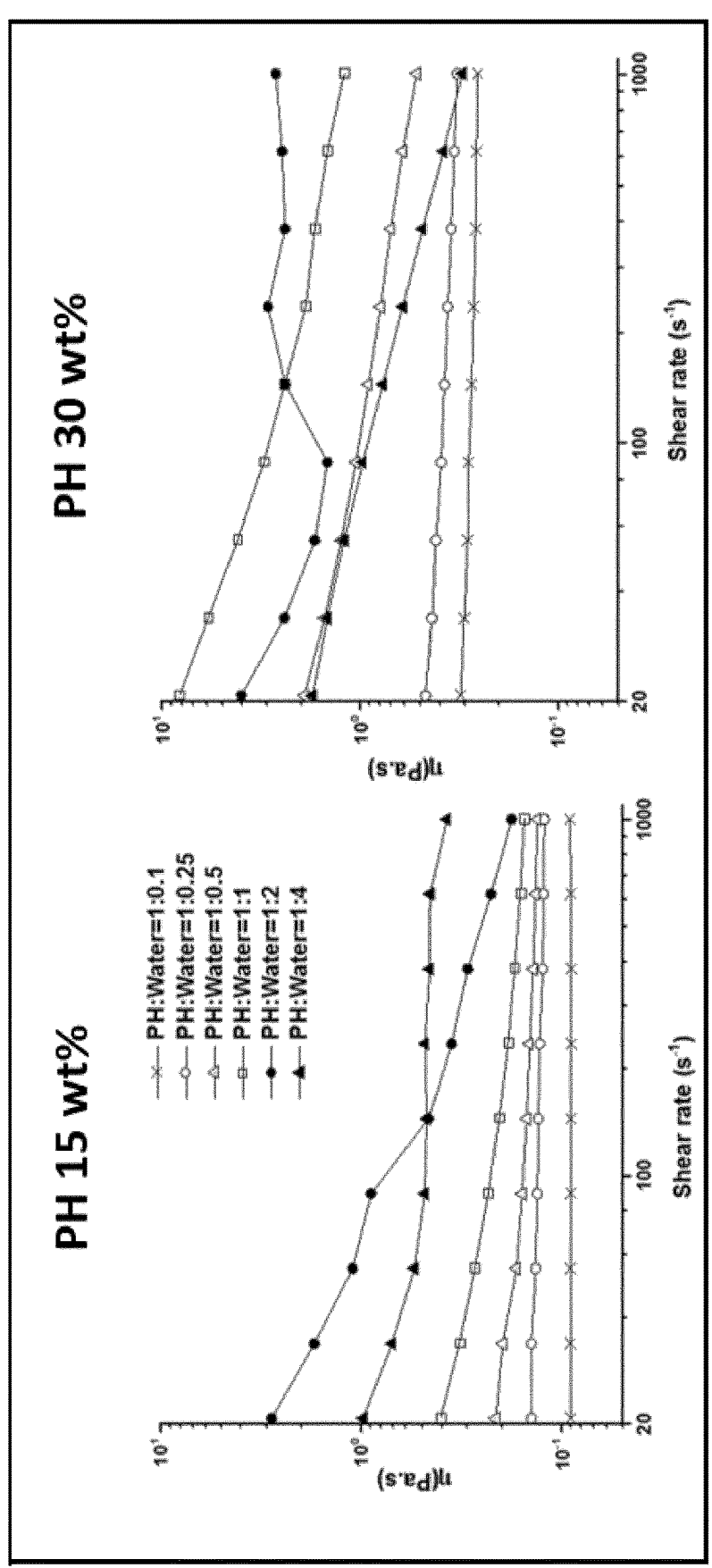
FIG. 9 shows plots of viscosity (Pa*s) as a function of shear rate ($s^{-1}$) for a PH-in-oil dispersion (15 wt. % on left, 30 wt. % on right) at different PH:water ratios.

FIGS. 8 and 9 show the viscosity of 15 wt % and 30 wt % particulate oil dispersions as function of PCW:water ratio (FIG. 8) and PH:water ratio (FIG. 9), respectively. All dispersions exhibit a Newtonian behavior at low FRPF:Water ratios ($\leq 1:0.25$). After the Newtonian limit, further addition of water lead to both particle swelling and particle aggregation which results in a shear thinning response. A positive relation between the increase in viscosity and the water addition is seen down to a ratio of 1:2 for FRPF at 15 wt % and 1:1 for FRPF at 30 wt %. Further addition of water (reducing the ratio to 1:4) leads to a decrease in viscosity as system becomes more diluted. At this high water content, the viscosity profile becomes irregular which reflects an increased sample heterogeneity.

Water content controls the shear flow response as both PCW and PH oil dispersions show the same viscosity increase upon water addition. However, viscosity values of PCW oil dispersions were higher than the corresponding PH viscosity (at both concentrations: 15 and 30 wt %) for all particle:water ratio, most likely due to the PCW dispersions' increased starch content.

Addition of Surfactant

In order to prevent particle aggregation, a separate study part was carried out where PGPR (Sigma-Aldrich) was added to the oil (at concentration of 0.5 and 2.5 wt. %) and gently stirred overnight to ensure complete solubilisation. Particulate oil-continuous dispersions were subsequently formed as previously described.

Figure 10:
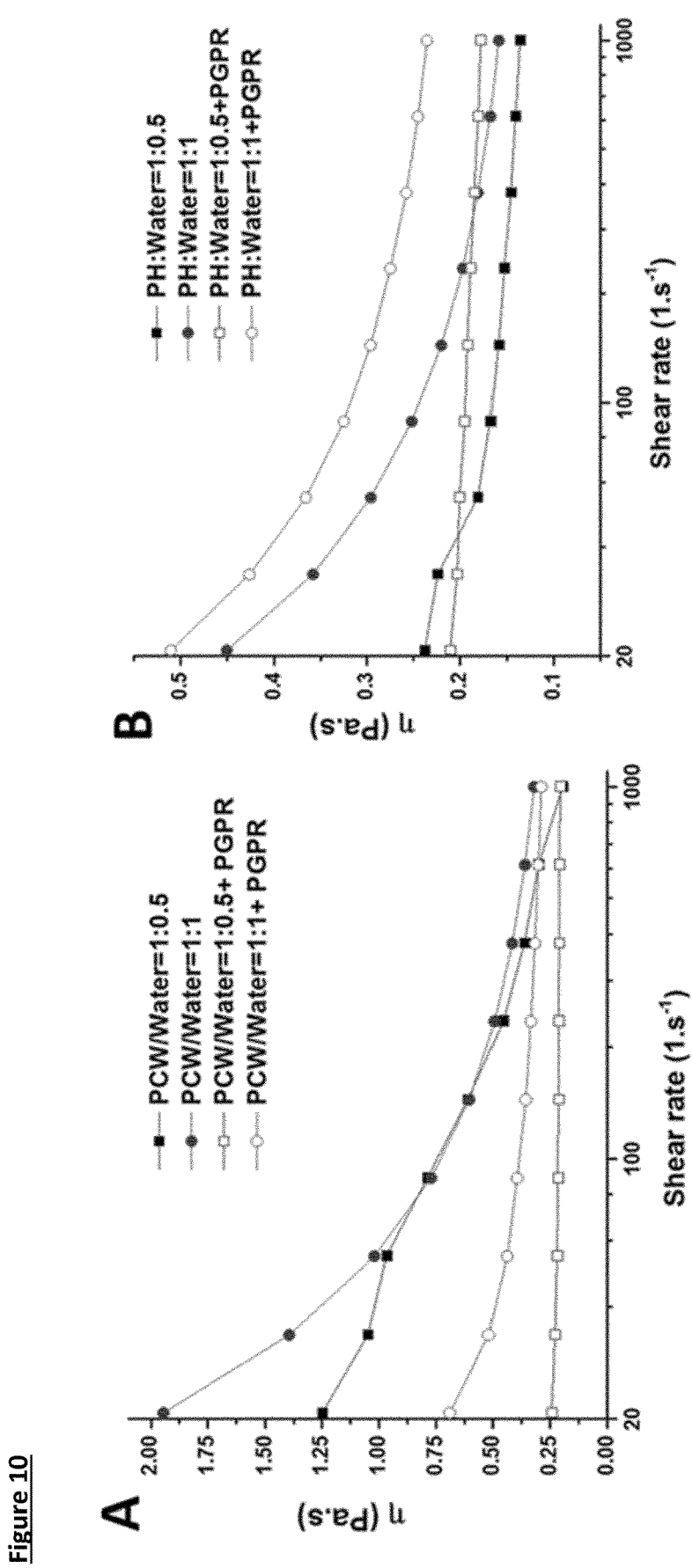
FIG. 10 shows plots of viscosity (Pa*s) as a function of shear rate ($s^{-1}$) for 15 wt % PCW and PH-in-oil dispersions at different PCW:water (panel A) and PH:water ratios (panel B). Each dispersion has been analysed in the presence (filled symbol) and absence (empty symbol) of 2.5 wt % PGPR.

The 15 wt % FRPF oil dispersions were analyzed at a FRPF:water ratio of 1:0.5 and 1:1 in the presence and absence of 2.5 wt % PGPR (FIG. 10). The strong decrease in viscosity (FIG. 10-A) upon addition of PGPR to the PCW dispersion is attributed to break up aggregates between starch-containing PCW particles. The effect of aggregate break up is such that a lower viscosity dependency on shear rate is measured.

On the contrary, the viscosity of PH dispersion increases upon PGPR addition most probably due to depletion flocculation. This mechanism could be the result of a weaker affinity of the cellulose-rich PH particles and the polar moieties of (—OH and —COOH groups) of PGPR, which would induce self-assembly of PGPR molecules thereby increasing apparent $\phi$. The addition of PGPR to the particulate oil dispersions with added water represents a powerful tool to tune the viscosity of the dispersions.

Example 2: Oil-Continuous Dispersions of Carrot Fibres with Water Addition

Carrot fibres (KaroPRO™ 1-18, Food Solutions Team, Switzerland) were dispersed in high oleic sunflower oil at a range of different volume fractions as for the pea fibres of Example 1. The carrot fibres had a particle size distribution D50 of 76.61 μm.

Figure 11:
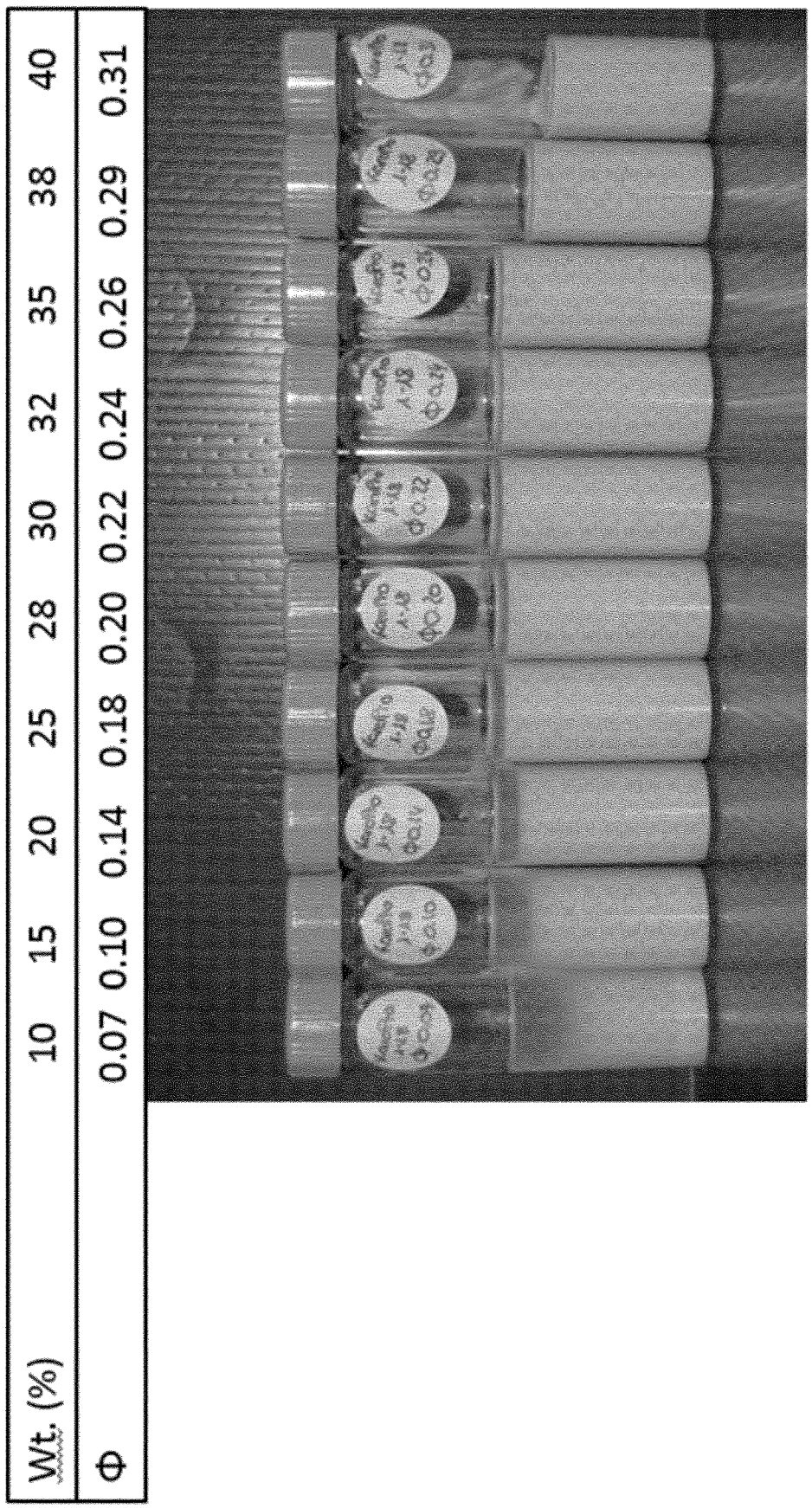
FIG. 11 shows images of dispersions of carrot fibre in oil

FIG. 11 shows images of the carrot fibre-in-oil dispersions after 3 hours. At 38 wt. % and 40 wt. % fibre the dispersion forms a paste. The 38 wt. % dispersion has more sedimentation and oiling out with time than the 40 wt. % fibre dispersion.

Figure 12:
FIG. 12 shows images of 20 wt % carrot dispersions with added water as a function of the fibre:water ratios. The pictures were taken at 20° C., 1 h after the sample preparation.

FIG. 12 shows dispersions of 20 wt. % carrot fibre in high oleic sunflower oil where different levels of water have been added in the same way as for Example 1. With a ratio fibre:water of 1:1.25, the dispersion forms a paste. As for pea fibre, the addition of water allows a paste to be formed at lower levels of fibre in the oil. Water addition also reduces sedimentation/oiling-out of the dispersion.

Figure 13:
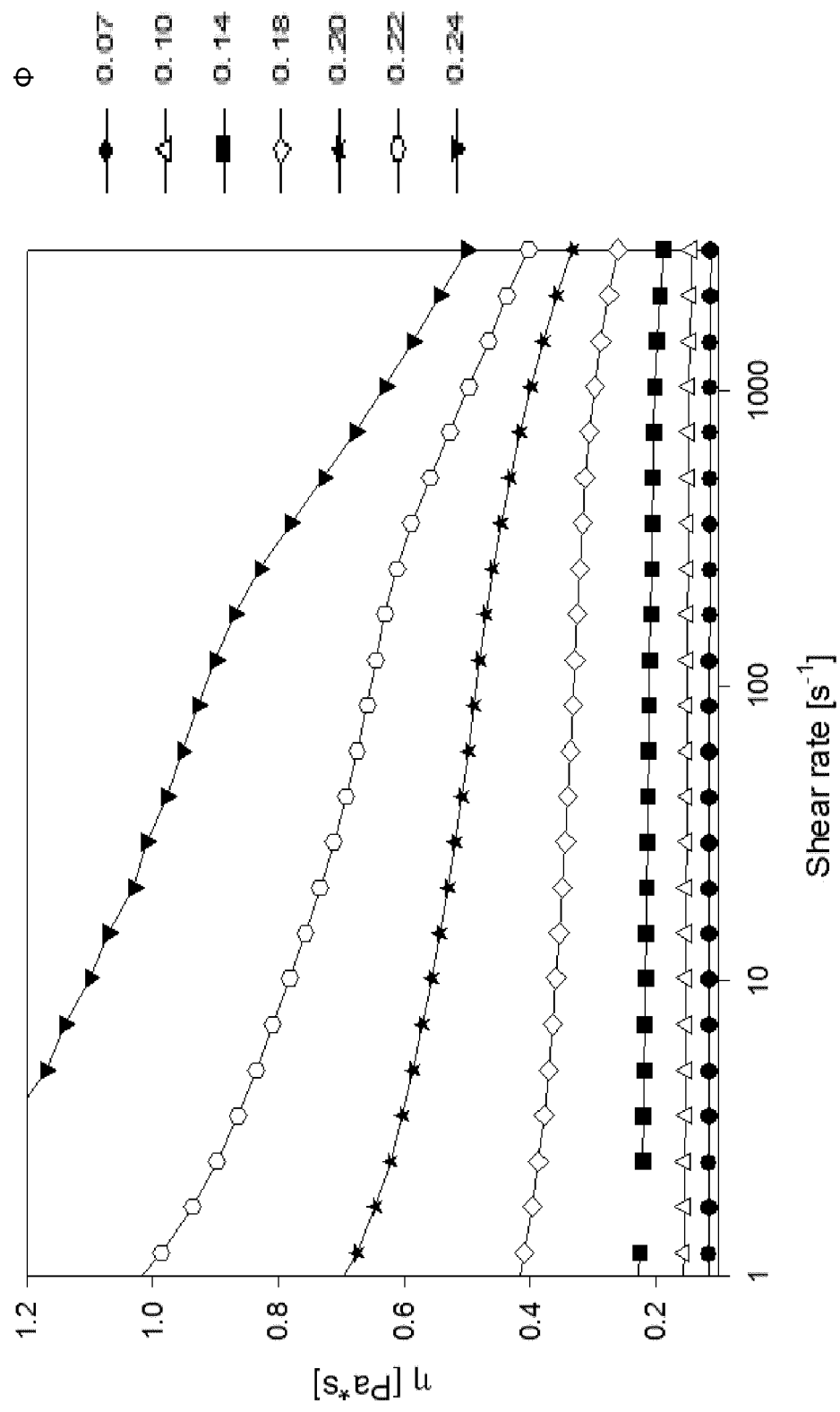
FIG. 13 is a plot of shear viscosity as function of shear rate for carrot fibre in oil dispersions at a range of volume fractions (φ).
Figure 14:
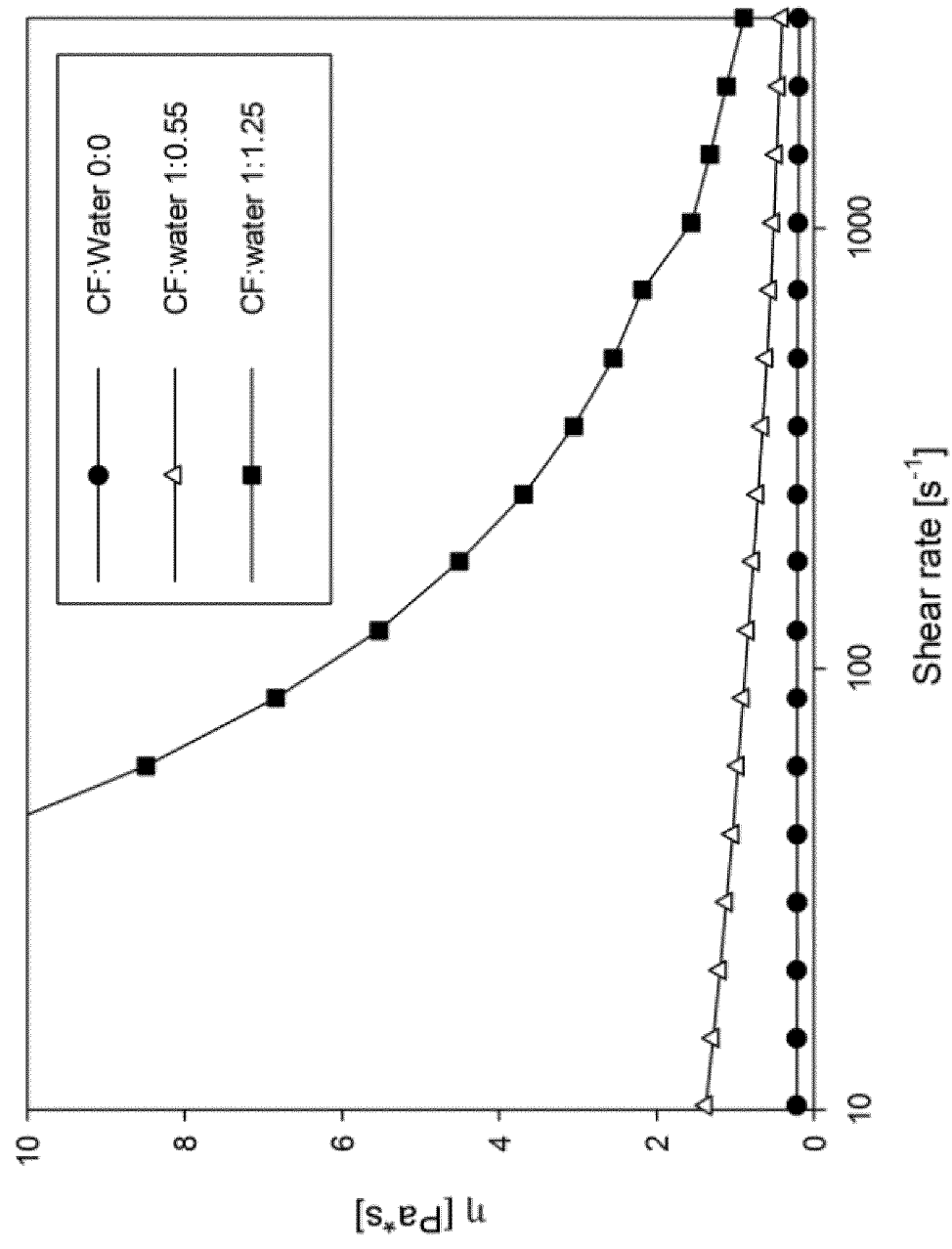
FIG. 14 shows plots of viscosity (Pa*s) as a function of shear rate ($s^{-1}$) for 20 wt. % carrot-in-oil dispersion at different carot:water ratios.

FIG. 13 shows the shear viscosity of the carrot fibre-in-oil dispersion, using the same method as for Example 1. FIG. 14 shows the viscosity of 20 wt % particulate oil dispersions with added water as function of carrot fibre:water ratio. At carrot fibre:water ratio of 1:1.25, both swelling and aggregation effects lead to significant viscosity increase and a pronounced shear thinning response. In a similar manner to the Pea Fibre systems, at optimum fibre:water ratio, viscosity does not plateau at low shear rates, indicating the presence of an apparent yield stress due to strong inter-particle interactions. Viscoelastic nature of the material and the presence of yield stress was confirmed by small amplitude oscillatory measurements.

Example 3: Puff Pastry with Water-Swelled Fibre

Laminated pastries were prepared with water-swelled fibres dispersed in oil and compared to a reference prepared with butter as the only fat. The overall composition of the reference before baking was:

| Ingredient | % |
|---|---|
| Butter | 33 |
| Wheat flour (12.5% protein) | 44 |
| Water | 22 |
| Salt | 1 |
| Total | 100 |

The butter used contained 82.2% fat and had a saturated fatty acid content of 54.9%.

Pastry dough was prepared in a Kenwood mixer by mixing the flour, salt and water for 1 minute at speed 4. The dough was rolled out into a square shape.

Butter was removed from storage at 4° C. and pounded with a rolling pin until it became pliable, formed into a flat piece and placed on the dough square. The combination was repeatedly folded onto itself and rolled out using a rolling pin. The lamination procedure was repeated six times, with the dough being chilled in a refrigerator in-between. The resulting laminated dough was rolled to 3 mm thickness in a pasta machine, cut into shapes, allowed to warm to room temperature and then baked at 180° C. for 20 minutes. The reference puff pastry using butter (recipe 34) had a good increase in size with defined layers visible.

The above process was repeated, but butter was replaced with high oleic sunflower oil [AAK] having a 14% saturated fatty acid content. However, the high oleic sunflower oil was too liquid and could not be spread onto the dough, it was absorbed by the dough or ran off the edges of the dough piece. The process was repeated, replacing part of the butter with high oleic sunflower oil and dispersed dietary fibre comprising water. Potato fibre (Hi-fiber 115 CH, supplier HIFOOD) D50=45 microns and pea hull fibre (Cosucra) were used as the dietary fibre. The fibre was present in the high oleic sunflower oil at a level of 40 wt. %. Water was added to the fibre at ratios between 0.6:3. and 0.67:1 of dietary fibre to water The dietary fibre was dispersed in high oleic sunflower oil (HOSFO) in a Kenwood mixer at speed 4 for 1 minute. Water was added to the mixture during mixing for a further minute. In the recipes with comprising butter, softened butter was then added and mixed for a further minute. The fat mixture was stored at 4° C. for 20 minutes before being used to prepare laminated dough.

The compositions of the fat phase (replacing the 33% butter in the reference) in weight percentage for the different recipes are shown in the table below.

| Recipe | HOSFO | Butter | Potato fibre | Pea fibre | water |
|---|---|---|---|---|---|
| 34 (reference) | 0 | 100 | 0 | 0 | 0 |
| 42 | 50 | 0 | 20 | 0 | 30 |
| 40 | 19.9 | 59.8 | 8.0 | 0 | 12.2 |
| 41 | 33.3 | 33.3 | 13.3 | 0 | 20.0 |
| 43 | 19.9 | 59.8 | 0 | 8.0 | 12.2 |

Figure 15:
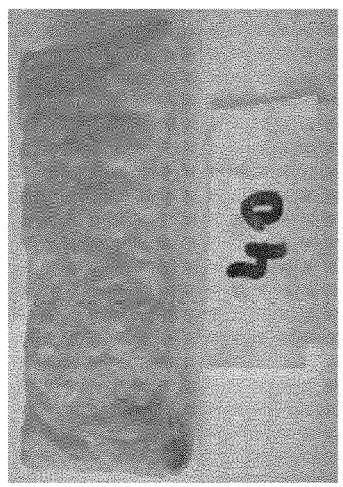
FIG. 15 shows laminated pastries from Example 3.
Figure 15:
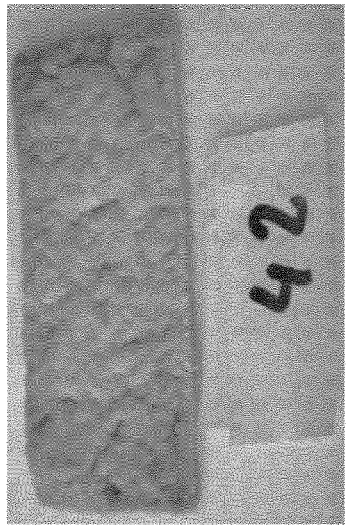
Figure 15:
Figure 15:
Figure 15:
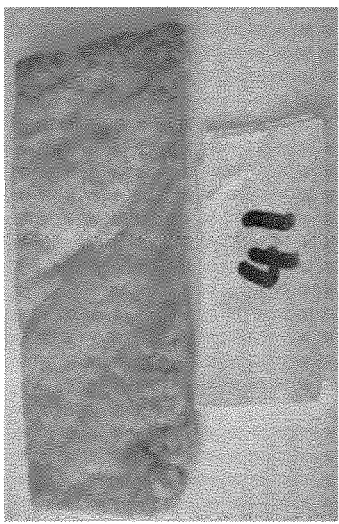

The pastries are shown in FIG. 15.

In contrast to using high oleic sunflower oil alone, the addition of dispersed dietary fibre comprising water (samples 40, 41, 42 and 43) enabled a laminated dough to be processed. Samples 41 and 43 showed a particularly good increase in size after baking, with defined layers visible. In the cooked pastry (7.5% moisture), Sample 41 had a saturated fatty acid content in the overall product of 9.5%, compared to the reference with 20.8%; a reduction of 55% in the saturated fat level. The saturated fatty acid content of the fat phase of sample 41 was 32.5% on a total fat basis. This demonstrates that the saturated fatty acid content of a food product may be reduced.

Example 4: Puff Pastry—Effect of Fibre Particle Size

Laminated pastries were prepared with milled and non-milled fibres dispersed in fat and compared to laminated pastries made with margarine.

Reference Laminated Pastry with Margarine

The overall composition of the dough in wt % before baking for the reference was:

| Ingredient | % |
|---|---|
| Margarine (M.U.M Food Co Ltd, Israel) | 32 |
| Wheat flour (Groupe Minoteries, Switzerland) | 42 |
| Water (added to the flour) | 25 |
| Salt | 1 |

The margarine comprised; palm oil (49%), soya oil (31%), water (18%) and emulsifiers—mono- and diglycerides of fatty acids and soy lecithin (1.2%). The saturated fatty acid content of the fat was 52.5%. The wheat flour ingredient had 12.5% protein and 12-15% moisture.

Pastry dough was prepared in a Kenwood Chef Classic mixer by mixing the flour, salt and water for 1 minute at speed 4. The dough was rolled out into a square shape. Margarine was removed from storage at 4° C. and kneaded until it became pliable, formed into a flat piece and placed on the dough square. The square was closed by folding each corner to the center. The dough was then stretched, always in the same direction, using a laminator (Rouvieres Slicing, 500 mm, Switzerland) until the length was 4 times longer than the width. The lamination procedure was repeated six times, with the dough being chilled in a refrigerator at 4° C. for 15 minutes in between.

The resulting laminated dough was rolled to 5 mm, cut into shapes, and then baked at 180° C. for 20 minutes in an oven (Combair SG Type BC-SG). The reference puff pastry using margarine had a good increase in size with defined layers visible. The saturated fatty acid content of the laminated pastry (on a dry basis) was 19.4%.

Laminated Pastry with Milled Fibres

The above process was repeated, but the margarine was replaced by a mixture of 74 wt. % low saturated fat shortening, 25 wt. % milled pea-cell wall fibres and 1 wt. % emulsifier, Palsgaard 1302 (mono- and diglycerides of fatty acids). The shortening fat had a saturated fatty acid content of 44.5%. The pea-cell wall fiber (Cosucra, Belgium) was jet-milled in an air jet mill (Fluid Jet J-70 micronizer) to a particle size distribution D50 of 25 microns. The shortening was fully melted and mixed with the milled pea fiber and emulsifier, then it was crystallized using an Armfield FT25 crystallizing unit. The mixture was left 2 weeks at 4° C. before it was used for making a laminated dough as for the reference.

After lamination and baking, the sample with milled fibres showed a similar increase in size to that obtained with the reference. The saturated fatty acid content of the laminated pastry on a dry basis was 14.1% (a 27% reduction compared with the reference).

Laminated Pastry with Un-Milled Fibres

Same procedure and composition as for the laminated pastry with milled fibres was repeated except that the pea-cell wall fibres were not milled. The pea-cell wall fibres had a D50 particle size distribution of 268 microns. The laminated pastry with un-milled fibres showed poor lifting. The final volume of the cooked dough was about 30% less than obtained with milled fibre. Various preferred features and embodiments of the present invention will now be described with reference to the following numbered paragraphs (paras).

1. Composition comprising a dispersion of dietary fibre particles in fat, wherein the dietary fibre particles have a particle size D50 of between 10 and 120 microns (for example between 20 and 90 microns) and comprise water at a weight ratio of dietary fibre to water of between 1:0.02 and 1:25.
2. A composition according to para 1 wherein the dietary fibre particles would reach a water content greater than 15 wt. % after 48 hours in an environment of 100% relative humidity and 25° C.
3. A composition according to para 1 or para 2 wherein the dietary fibre is selected from the group consisting of pea fibre, lentil fibre, fava bean fibre, lupin fibre, chick pea fibre, black bean fibre, potato fibre, carrot fibre, beetroot fibre, pumpkin fibre, kale fibre, psyllium fibre, apple fibre, citrus fibre, oat bran, maize bran, rice bran, barley bran, wheat bran, fibers from microorganisms and combinations of these.
4. A composition according to any one of paras 1 to 3 wherein the weight of dietary fibre is between 0.5 and 50% of the weight of fat.
5. A composition according to any one of paras 1 to 4 wherein a solute is dissolved in the water.
6. A composition according to any one of paras 1 to 5 wherein the fat has a saturated fatty acid content below 50 wt. %.
7. A composition according to any one of paras 1 to 6 wherein the composition does not comprise a surfactant.
8. A composition according to any one of paras 1 to 7 wherein at least 90 wt. % of the total water of the composition is absorbed into or adsorbed onto the dietary fibre.
9. Food product comprising the composition of any one of paras 1 to 8.
10. A food product according to para 9 which is a chilled or frozen ready-to-cook product.
11. A food product according to para 10 which is a laminated pastry product.
12. A laminated pastry product comprising a plurality of thin sheets of cooked pastry dough, the sheets of cooked dough being separated by a composition comprising fat and dietary fibre particles, the dietary fibre particles having a particle size D50 of between 10 and 120 microns (for example between 20 and 90 microns, for example between 10 and 70 microns, for example between 10 and 50 microns, for example between 10 and 40 microns, for further example between 10 and 30 microns).
13. A laminated pastry product according to para 12 wherein the dietary fibre particles would reach a water content greater than 15 wt. % after 48 hours in an environment of 100% relative humidity and 25° C., for example they would reach a water content between 15 and 300 wt. % after 48 hours in an environment of 100% and 25° C., for further example they would reach a water content between 20 and 50 wt. % after 48 hours in an environment of 100% relative humidity and 25° C.
14. A laminated pastry product according to para 12 or para 13 wherein the dietary fibre is selected from the group consisting of pea fibre (such as pea hull fibre or pea cell wall fibre), lentil fibre, fava bean fibre, lupin fibre, chick pea fibre, black bean fibre, potato fibre, carrot fibre, beetroot fibre, pumpkin fibre, kale fibre, psyllium fibre, apple fibre, citrus fibre (such as cellulose rich fractions of citrus fibre or pectin rich fractions of citrus fibre), oat bran, maize bran, rice bran, barley bran, wheat bran, fibre from microorganisms and combinations of these; for example, the dietary fibre may be selected from the group consisting of pea fibre, lentil fibre, fava bean fibre, lupin fibre, chick pea fibre, black bean fibre, potato fibre, carrot fibre, beetroot fibre, pumpkin fibre, kale fibre, apple fibre, citrus fibre and combinations of these; for further example, the dietary fibre may be selected from the group consisting of pea fibre, lentil fibre, fava bean fibre, lupin fibre, chick pea fibre, black bean fibre, potato fibre, carrot fibre, beetroot fibre, pumpkin fibre, kale fibre and combinations of these; for further example, the dietary fibre may be selected from the group consisting of pea fibre, potato fibre, carrot fibre and combinations of these; for further example the dietary fibre may be selected from the group consisting of pea hull fibre, pea cell wall fibre and carrot fibre, for further example the dietary fibre may be potato or pea.
15. A laminated pastry product according to any one of paras 12 to 14 wherein the weight of dietary fibre is between 0.5 and 50% of the weight of fat, for example between 5 and 40% of the weight of fat, for further example between 10 and 35% of the weight of fat.
16. A laminated pastry product according to any one of paras 12 to 15 wherein the fat has a solid fat content of less than 50% at 20° C., for example less than 30% at 20° C., for further example less than 10% at 20° C., for further example less than 1% at 20° C., for still further example 0% at 20° C.
17. A laminated pastry product according to any one of paras 12 to 16 wherein the fat has a saturated fatty acid content below 50%, for example below 35%, for example below 25%, for further example below 20%.
18. A laminated pastry product according to any one of paras 12 to 17 wherein the fat comprises (for example consist of) fats selected from the group consisting of high oleic sunflower oil, high oleic safflower oil, high oleic soybean oil, high oleic rapeseed oil such as high oleic canola oil, algal oil (for example high oleic algal oil), olive oil, macademia nut oil, hazelnut oil, avocado oil, sunflower oil, rapeseed oil, soybean oil, grape-seed oil, cotton-seed oil, corn oil and combinations of these.

19. A laminated pastry product according to any one of paras 12 to 17 comprising a surfactant (such as a surfactant added in the lamination fat), for example a surfactant selected from the group consisting of lecithin; mono- and di-glycerides; derivatives such as acetylated, succinylated and diacetylated tartaric esters of distilled monoglycerides; lactylated esters; sorbitan esters; polysorbates; propylene glycol esters; sucrose esters; polyglycerol esters and combinations of these, for further example mono- and di-glycerides.

20. Use of a composition according to any one of paras 1 to 8 to reduce the saturated fatty acid content of a food product.

21. Process for preparing a composition according to any one of paras 1 to 8 comprising the steps of
    a. dispersing particles of dietary fibre in fat, wherein the dietary fibre particles have a particle size D50 of between 10 and 120 microns (for example between 20 and 90 microns, for example between 10 and 70 microns, for example between 10 and 50 microns, for example between 10 and 40 microns, for further example between 10 and 30 microns); and
    b. adding water to the dispersion of particles of dietary fibre in fat while mixing the dispersion.

22. Process for making laminated pastry comprising the steps of
    a. dispersing particles of dietary fibre in fat, wherein the dietary fibre particles have a particle size D50 of between 10 and 120 microns (for example between 20 and 90 microns);
    b. forming pastry dough into a dough sheet;
    c. applying a layer comprising the dispersion of step a to the dough sheet to form a combined sheet; and
    d. folding and compressing the combined sheet at least twice to form a laminated pastry.

23. Process for making a laminated pastry according to any one of paras 12 to 19 comprising the steps of
    e. dispersing particles of dietary fibre in fat, wherein the dietary fibre particles have a particle size D50 of between 10 and 120 microns (for example between 20 and 90 microns);
    f. forming pastry dough into a dough sheet;
    g. applying a layer comprising the dispersion of step a to the dough sheet to form a combined sheet; and
    h. folding and compressing the combined sheet at least twice to form a laminated pastry.

The invention claimed is:

1. A process for making laminated pastry, the process comprising:
   (a) dispersing particles of dietary fibre in fat to form a dispersion, the particles of dietary fibre comprising water at a weight ratio of the dietary fibre to the water between 1:0.02 and 1:25, the particles of dietary fibre having a particle size D50 of between 10 and 120 microns, and the dietary fibre is selected from the group consisting of pea fibre, potato fibre, carrot fibre, and mixtures thereof;
   (b) forming pastry dough into a dough sheet;
   (c) applying a layer comprising the dispersion of step (a) to the dough sheet of step (b) to form a combined sheet; and
   (d) folding and compressing the combined sheet at least twice to form the laminated pastry.

2. The process of claim 1, wherein the dietary fibre consists of pea fibre.

3. The process of claim 1, wherein the dietary fibre consists of potato fibre.

4. The process of claim 1, wherein the dietary fibre consists of carrot fibre.

5. The process of claim 1, wherein the particles of dietary fibre comprise a water content greater than 15 wt. % after 48 hours in an environment of 100% relative humidity and 25° C.

6. The process of claim 1, wherein the weight of the dietary fibre is between 0.5 and 50 wt. % of the fat.

7. The process of claim 1, wherein a solute is dissolved in the water.

8. The process of claim 1, wherein the fat has a saturated fatty acid content below 50 wt. %.

9. The process of claim 1, wherein at least 90 wt. % of the water is absorbed into or adsorbed onto the dietary fibre.

* * * * *